United States Patent
Tadokoro et al.

(10) Patent No.: US 6,652,985 B1
(45) Date of Patent: Nov. 25, 2003

(54) ACRYLIC RESIN LAMINATED FILM AND LAMINATED ARTICLE

(75) Inventors: Yoshio Tadokoro, Otsu (JP); Yousuke Tsukuda, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/513,765

(22) Filed: Feb. 25, 2000

(30) Foreign Application Priority Data

| Mar. 3, 1999 | (JP) | ............................................ | 11-056126 |
| Mar. 3, 1999 | (JP) | ............................................ | 11-056127 |
| Mar. 17, 1999 | (JP) | ............................................ | 11-071810 |

(51) Int. Cl.$^7$ .............................................. B32B 27/08
(52) U.S. Cl. ........................ 428/520; 428/515; 428/522
(58) Field of Search ................................ 428/520, 515, 428/500, 323, 327, 480, 483, 522, 523

(56) References Cited

U.S. PATENT DOCUMENTS

| 3,626,026 A | * | 12/1971 | Fukumura et al. | ........... | 525/166 |
| 4,536,546 A | * | 8/1985 | Briggs | ........................ | 525/83 |
| 4,916,184 A | * | 4/1990 | Clark | ........................ | 525/27 |
| 5,026,805 A | * | 6/1991 | Hosoya et al. | ............... | 526/309 |
| 5,051,266 A | * | 9/1991 | Juhl et al. | .................... | 428/520 |
| 5,108,844 A | * | 4/1992 | Blemberg et al. | ........... | 428/518 |
| 5,178,946 A | * | 1/1993 | Sato et al. | ................... | 428/412 |
| 5,278,271 A | * | 1/1994 | Miyajima et al. | ......... | 526/307.3 |
| 5,312,714 A | * | 5/1994 | Ogawa | ........................ | 430/273 |
| 5,413,660 A | * | 5/1995 | Harvey et al. | ............... | 156/243 |
| 5,480,720 A | * | 1/1996 | Eisenhart et al. | ........... | 156/330 |
| 5,563,227 A | * | 10/1996 | Kitaike et al. | ............... | 428/402 |
| 6,042,945 A | * | 3/2000 | Maekawa | ................ | 428/411.1 |
| 6,306,520 B1 | * | 10/2001 | Nagata et al. | ............... | 428/520 |

FOREIGN PATENT DOCUMENTS

| DE | 198 59 456 A1 | * | 7/1999 |
| EP | 0 318 197 | * | 5/1989 |
| JP | 06255048 | | 9/1994 |
| JP | 09193189 | | 7/1997 |
| JP | 09234836 | | 9/1997 |
| JP | 10052893 | | 2/1998 |
| JP | 11 105207 A | * | 4/1999 |

* cited by examiner

*Primary Examiner*—Monique R. Jackson
(74) *Attorney, Agent, or Firm*—Fitch, Even, Tabin & Flannery

(57) ABSTRACT

The present invention provides an acrylic resin laminated film comprising a first layer comprising an acrylic resin and a second layer comprising a resin composition comprising (a) an acrylic resin and an olefin-based copolymer obtained by copolymerization of an olefin and at least one monomer selected from the group consisting of unsaturated carboxylic acids, unsaturated carboxylates, unsaturated carboxylic anhydrides and vinyl acetate, or (b) an olefin-based copolymer obtained by copolymerization of an olefin and a monomer having glycidyl group in a side chain, which has excellent melt-adhesion to both of an acrylic resin and a polyolefin-based resin and additionally, and a laminated article which, due to the use of this acrylic resin laminated film, has excellent transparency, ornamental property, surface hardness, weather-resistance, oil-resistance and the like which are characteristics of an acrylic-resin constituting the most outer surface, and additionally, manifests excellent molding processability, recycling property, punching and bending processability, heat-resistance, cold-resistance and the like which are characteristics of a polyolefin-based resin which is a substrate.

8 Claims, No Drawings

# ACRYLIC RESIN LAMINATED FILM AND LAMINATED ARTICLE

BACKGROUND OF THE INVENTION

1. Field of the Invention

The present invention relates to a novel acrylic resin laminated film particularly having excellent melt-adhesion to a polyolefin-based resin, and a novel laminated article using the acrylic resin laminated film.

This acrylic resin laminated film is useful for providing characteristics such as ornamental property, transparency, surface hardness, weather-resistance and the like.

2. Description of related Art

Acrylic resins are used widely in various fields such as sign boards and illumination covers and the like because of excellent transparency, ornamental property, surface hardness, weather-resistance, oil-resistance and the like, however, have a problem that impact-resistance and bending strength thereof are not sufficient leading to cracking tendency.

Therefore, plates, sheets, films and the like occupying main portion of acrylic resin products can not basically be punched or bent, and there has been only an inefficient cutting work against recent increasing needs for sign boards having three-dimensional form and unique forms and the like.

On the other hand, polyolefin-based resins are often used, for example, for interior and exterior parts of automobiles, parts of domestic electric appliances and the like because of excellent molding processability, recycling property, punching and bending processability, heat-resistance, cold-resistance and the like, however, have problems that it is difficult to maintain gloss of a surface because hardness thereof is low causing scarce maintenance of gloss, and further, ornamental property and weather-resistance are poor.

It is expected that, if the surface of a substrate made of a polyolefin-based resin is coated with an acrylic resin, a laminated article having simultaneously excellent properties of both resins can be produced. However, a method in which a curable paint composed of an acrylic resin is coated on a substrate and baked for curing needs a lot of processes causing inefficiency, and additionally, tends to cause a environmental problem that an organic solvent contained in the paint is discharged in a drying process.

Further, there is also a problem that an acrylic resin film formed as described above are not sufficient particularly in surface hardness, weather-resistance, oil-resistance and ornamental property as compared with the usual plates, sheets, films and the like of an acrylic resin.

There is an investigation for producing a laminated article by using a so-called integrated adhering molding method and the like in which an acrylic resin sheet or film is set at given position in a cavity corresponding to the form of the laminated article, in a mold, and a polyolefin-based resin forming a substrate is heat-melted and poured into the cavity and cooled and solidified before being removed from the mold, for integration of them by melt-adhesion.

However, since they have basically no compatibility, they can not be directly melt-adhered.

Therefore, there are various acrylic resin laminated films suggested in which melt-adhesion to a polyolefin-based resin substrate is imparted by laminating a single or a plurality of intermediate layers having melt-adhesion to a polyolefin-based resin.

For example, Japanese Patent Application Laid-Open (JP-A) No. 9-234836 has disclosed a laminated film of multi-layer structure having three or more layers in which a polyolefin-based resin layer is laminated to the lower side of an acrylic resin layer as the surface layer via a layer of a curing type adhesive such as, for example, a two-pack curing type urethane-based resin and the like.

JP-A No. 9-193189 has also disclosed a laminated film of multi-layer structure having three or more layers in which a layer of a modified olefin polymer having a carboxyl group, acid anhydride group, hydroxyl group, glycidyl group and the like is inserted between an acrylic resin layer as the surface layer and a polyolefin-based resin layer.

In these laminated films, melt-adhesion to a polyolefin-based resin substrate is imparted by a polyolefin-based resin layer laminated to the lowest layer thereof.

However, since the above-described laminated film of multi-layer structure tends to necessarily have increased thickness, therefore, when a polyolefin-based resin substrate is melt-adhered by, for example, the integrated adhering molding method and the like, to the polyolefin-based resin side of the laminated substrate, a large difference in heat history is caused between the opposite acrylic resin layer which has been scarcely heated because of close contact with the mold. Therefore, there is a problem that large warping deformation which can not be prevented only by control of molding conditions and the like for example tends to occur in the resulted product.

There is a fear that the produced laminated article, because of large thickness as described above, easily causes fragile fracture even at temperature range in which a article composed only of a polyolefin-based resin causes ductile fracture, and this being a factor for reduction of mechanical abilities of a article at low temperature.

Further, there is also a problem that when a laminated film of multi-layer structure as described above is used, a lot of layers are required as described above, leading to increase in the cost of the product.

Japanese Patent Application Publication (JP-B) No. 6-26718 has disclosed the use of a chlorinated polyolefin-based adhesive ("Chlorinated polyolefin 343-1" manufactured by Eastman Kodak US) having excellent melt-adhesion to both of an acrylic resin and a polyolefin-based resin.

By the use of such a chlorinated polyolefin-based adhesive, solution of the above-described problems may be expected since a layer of a polyolefin-based resin can be omitted to reduce the number of layers in the laminated film.

However, this generates a fear regarding influences caused by chlorine and a compound thereof in discarding the laminated article and the like.

SUMMARY OF THE INVENTION

The object of the present invention is to provide a novel acrylic resin laminated film which can reduce the number of layers than ever, has excellent melt-adhesion to a polyolefin-based resin substrate, and causes no fear regarding influences caused by chlorine and the like in discarding the laminated article and the like.

Another object of the present invention is to provide a laminated article which, due to the use of the above-described acrylic resin laminated film, has no fear to cause various problems such as the above-described warping deformation, reduction of mechanical abilities, increase in cost, influences caused by chlorine and a compound thereof, and the like, and further, has excellent abilities of both of an acrylic resin and a polyolefin-based resin simultaneously.

For solving the above-described problems, the present inventors have intensively studied particularly a resin composition constituting an adhesive layer of an acrylic resin laminated film.

Resultantly, the present inventors have found that a resin composition comprising (a) an acrylic resin and an olefin-based copolymer obtained by copolymerization of an olefin and at least one monomer selected from the group consisting of unsaturated carboxylic acids, unsaturated carboxylates, unsaturated carboxylic anhydrides and vinyl acetate, or (b) an olefin-based copolymer obtained by copolymerization of an olefin and a monomer having glycidyl group in a side chain, has excellent melt-adhesion to both of an acrylic resin and a-polyolefin-based resin, and additionally, by using these resin composition or copolymer as an adhesive layer, the number of layers of an acrylic resin laminated film can be decreased, and a laminated article which, due to the use of the above-described acrylic resin laminated film, has no fear to cause various problems such as the warping deformation, reduction of mechanical abilities, increase in cost, influences caused by chlorine and a compound thereof and the like, and further has excellent abilities of both of an acrylic resin and a polyolefin-based resin simultaneously, completing the present invention.

Accordingly, the present invention provides an acrylic resin laminated film comprising a first layer comprising an acrylic resin and a second layer comprising a resin composition comprises;

(a) an acrylic resin and an olefin-based copolymer obtained by copolymerization of an olefin and at least one monomer selected from the group consisting of unsaturated carboxylic acids, unsaturated carboxylates, unsaturated carboxylic anhydrides and vinyl acetate, or (b) an olefin-based copolymer obtained by copolymerization of an olefin and a monomer having glycidyl group in a side chain.

Further, the present invention provides a laminated article wherein the acrylic resin laminated film is laminated and integrated onto the surface of a substrate comprising a polyolefin-based resin so that the second layer is in contact with the substrate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

A shape of the acrylic resin laminated film of the present invention includes not only a film-form but also a sheet-form and a plate-form.

As the acrylic resin constituting the first layer of the acrylic resin laminated film of the present invention, polymers of alkyl methacrylates and copolymers of alkyl methacrylates and alkyl acrylates are exemplified, wherein the number of carbon atoms in the alkyl group are 1 to about 5.

Specific examples of the alkyl methacrylate include methyl methacrylate, ethyl methacrylate, propyl methacrylate butyl methacrylate, amyl methacrylate and the like, and specific examples of the alkyl acrylate include methyl acrylate, ethyl acrylate, propyl acrylate, butyl acrylate, amyl acrylate and the like.

As this acrylic resin, those commercially available as general acrylic resins can be used.

As the acrylic resin constituting the first layer, an acrylic resin containing a 6-membered ring acid anhydride unit represented by the general formula (i) in an amount of about 3 to 30% by weight is also preferably used.

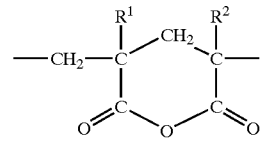

(i)

(wherein, $R^1$ and $R^2$ are the same or different and represent a hydrogen atom or an alkyl group having 1 to about 5 carbon atoms)

Examples of the alkyl group represented by $R^1$, $R^2$ in the above-described general formula (i) include alkyl groups having 1 to about 5 carbon atoms such as methyl, ethyl, n-propyl, isopropyl, n-butyl, t-butyl, sec-butyl, amyl and the like.

The heat-resistance of the first layer is mainly improved by the action of a 6-membered ring acid anhydride unit.

The acrylic resin containing a 6-membered ring acid anhydride unit can be produced by modification by heating the above-described polymer derived from one or more of acrylic acid, methacrylic acid and esters or salts thereof at a temperature from about 150 to 350° C., particularly from about 220 to 320° C. in the presence of a basic compound such as sodium hydroxide, potassium hydroxide, sodium methylate and the like.

When the content of a 6-membered ring acid anhydride unit in the acrylic resin is not more than about 3% by weight, there is a fear that the effect for improving the heat-resistance of the first layer by introduction of the anhydride unit becomes insufficient and, on the other hand, when the content is not less than about 30% by weight, there is a fear that the melt-viscosity of the acrylic resin increases excessively to decrease molding processability thereof and the first layer having uniform thickness can not be formed by a T-die extrusion molding method and the like described later.

The content of a 6-membered ring acid anhydride unit in the acrylic resin is preferably within the range particularly from about 5 to 25% by weight in view of simultaneous accomplishment of the molding processability of the acrylic resin and the heat-resistance of the layer.

The acrylic resin containing a 6-membered ring acid anhydride unit is preferably mixed with other resin which particularly has compatibility with the acrylic resin and can form a uniform layer, and in this case, the content of the acrylic resin containing a 6-membered ring acid anhydride unit is from about 10 to 70% by weight, preferably from about 20 to 50% by weight based on the total amount of the resins.

When the content of the acrylic resin containing a 6-membered ring acid anhydride unit is not more than about 10% by weight, there is a fear that the effect for improving the heat-resistance of the first layer becomes insufficient and, on the other hand, when the content is not less than about 70% by weight, the first layer comprising the acrylic resin tends to become fragile causing poor handling.

As the other resin mixed together with the acrylic resin containing a 6-membered ring acid anhydride unit, there can be used any of various resins having compatibility with the acrylic resin and being able to form a uniform layer, and particularly when properties specific to acrylic resins such as transparency, surface hardness, weather resistance and the like are taken into consideration, it is preferable to use usual acrylic resins which have not been subjected to the above-described modification treatment, namely, polymers of alkyl methacrylate and copolymers of alkyl methacrylate and alkyl acrylate and the like.

As the acrylic resin constituting the first layer, an acrylic resin containing an acrylic polymer (c) having a weight-average molecular weight of about 70000 to 600000 and a glass transition temperature of about 60 to 110° C. and acrylic polymer particles (d) having a multi-layer structure which contains a rubber elastomer layer dispersed in the acrylic polymer(c) in a ratio by weight (c/d) of about 95/5 to 50/50 is also preferably used.

As the acrylic resin for dispersing the acrylic polymer particles, those having a weight-average molecular weight from about 70000 to 600000, preferably from about 100000 to 500000 and having a glass transition temperature from about 60 to 110° C., preferably from about 90 to 105° C. as described above are used.

When the weight-average molecular weight is out of the above-described range, there is a fear that handling becomes poor inprocessability thereof, and when the glass transition temperature is out of the above-described range, there is a fear that handling becomes poor because heat-resistance and thermal decomposition property becomes poor.

As the acrylicpolymer particle of multi-layer structure having a rubber elastomer layer, there are listed, for example, (1) a particle of two-layer structure comprising an inner layer formed from an alkyl acrylate having about 4 to 8 carbon atoms in the alkyl group and a rubber elastomer which is a copolymer with a poly-functional monomer, and an outer layer formed from a hard polymer comprising methyl methacrylate as a main component, (2) a particle of three-layer structure comprising an inner layer formed from a hard polymer composed of methyl methacrylate as a main component, an intermediate layer formed from the same rubber elastomer as described above, and an outer layer formed from a hard polymer comprising methyl methacrylate as a main component, and the like.

The particle size of the particle is not particularly restricted, and preferably from about 100 to 400 μm, further preferably from about 200 to 300 μm in terms of the average particle size in view of the balance between uniformity, transparency, impact-resistance and the like of the first layer.

An acrylic polymer particle having such a multi-layer structure can be produced by, for example, a multi-stage sequential production polymerization method described in Japanese Patent Application Publication (JP-B) No. 55-27576, and the like.

The reason why the acrylic resin (c) and the acrylic polymer particles (d) are contained in a ratio by weight (c/d) of 95/5 to 50/50 in the acrylic resin as described above is that when the amount of the acrylic polymer particles (d) is not more than this range, there is a fear that the effect of improving the impact-resistance of the layer by inclusion of the particles (d) becomes insufficient, and on the other hand, when the amount of the acrylic polymer particles (d) is over than this range, there is a fear that the layer is whitened and transparency thereof decreases.

The compounding ratio (c/d) is further preferably within the range particularly about from about 80/20 to 60/40 from the standpoints of impact-resistance and transparency of the first layer.

The acrylic resin constituting the first layer contains the acrylic resin particles, and may also be mixed with other resin which has compatibility with the acrylic resin and can form a uniform layer. In this case, the content of the acrylic resin which contains the acrylic polymer particles is preferably about 50% by weight or more, particularly about 70% by weight or more based on the total amount of the resins.

When the content of the acrylic resin which contains the acrylic polymer particles is not more than the above-described range, there is a fear that the effect for improving the heat-resistance of the first layer by the dispersed structure of the acrylic resin which contains the acrylic polymer particles becomes insufficient.

As the other resin mixed together with the acrylic resin which contains the acrylic polymer particle, there can be used any of various resins having compatibility with the acrylic resin and being able to form a uniform layer, and particularly when properties specific to acrylic resins such as transparency, surface hardness, weather resistance and the like of the layer are taken into consideration, it is most preferable to use a polymer derived from one or more usual acrylic resins which have not been subjected to modification treatment and the like, namely, polymers of alkyl methacrylate and copolymers of alkyl methacrylate and alkyl acrylate and the like.

The acrylic resin which contains the acrylic polymer particles is preferably used from the standpoint of providing impact-resistance. But, the acrylic resin which does not contain the acrylic polymer particles is preferably used from the standpoint of weather-resistance and chemical-resistance.

The first layer comprising the acrylic resin can be formed by known processing methods typified by, for example, a T-die extrusion molding method, a calender method and the like.

The thickness of the first layer is not particularly restricted, and preferably from about 40 to 300 μm, further preferably from about 80 to 250 μm.

If the thickness of the first layer is not more than about 40 μm, when a substrate comprising of a polyolefin-based resin is integration-pasting-molded as described above, there is a fear that the first layer tends to make a wrinkle causing reduction in design of a laminated article as a commercial product. On the other hand, if the thickness of the layer is not less than about 300 μm, there is a fear that integration-pasting-molding of a substrate while allowing the first layer to sufficiently follow fine irregularity of the intended laminated article becomes difficult, and in addition, there are fears that large warping occurs in the produced laminated article by a difference in heat histories between the front surface and the rear surface of the acrylic resin laminated film occurs in the integration-pasting-molding due to increase in the thickness of whole acrylic resin laminated film, and mechanical abilities particularly at lower temperature of the laminated article lower.

The second layer to be combined with the first layer comprising a resin composition comprising:

(a) an acrylic resin and an olefin-based copolymer obtained by copolymerization of an olefin and at least one monomer selected from the group consisting of unsaturated carboxylic acids, unsaturated carboxylates, unsaturated carboxylic anhydrides and vinyl acetate; or (b) an olefin-based copolymer obtained by copolymerization of an olefin and a monomer having glycidyl group in a side chain.

As the acrylic resin in the resin composition comprising (a) an acrylic resin and an olefin-based copolymer, the same one as the acrylic resin constituting the first layer is used.

The olefin copolymerized with at least one monomer selected from the group consisting of unsaturated carboxylic acids, unsaturated carboxylates unsaturated carboxylic anhydrides and vinyl acetate is α-olefin, and examples of α-olefin include ethylene, propylene, butene-1, penten-1, hexene-1, octene-1, decene-1, 3-methyl butene-1, 4-methyl pentene-1, and the like. It is possible to use two or more kind of these olefins.

Examples of unsaturated carboxylic acid include acrylic acid and methacrylic acid.

Examples of unsaturated carboxylate include methyl acrylate, ethyl acrylate, 2-ethylhexcyl acrylate, stearyl acrylate, methyl methacrylate, ethyl methacrylate, 2-ethylhexcyl methacrylate, stearyl methacrylate, glycidyl acrylate, glycidyl methacrylate, glycidyl esters of itaconic acid, and the like.

Examples of unsaturated carboxylic anhydride include maleic acid anhydride and the like.

As the olefin-based copolymer, ethylene-based copolymer is preferably used. Examples of ethylene-based copolymer include a copolymer of ethylene and acrylic acid, a copolymer of ethylene and methacrylic acid, a copolymer of ethylene and methyl acrylate, a copolymer of ethylene and ethyl acrylate, a copolymer of ethylene and methyl metacrylate, a copolymer of ethylene and ethyl methacrylate, a copolymer of ethylene and vinyl acetate, a copolymer of ethylene and glycidyl methylacrylate, a copolymer of ethylene, methyl acrylate and glycidyl methacrylate, a copolymer of ethylene, vinyl acetate and glycidyl methacrylate, a copolymer of ethylene and maleic acid anhydride, and the like.

A copolymer of ethylene and methyl metacrylate, a copolymer of ethylene and vinyl acetate and a copolymer of ethylene, vinyl acetate and glycidyl methacrylate are preferably used.

In the above-described olefin-based copolymer, the ratio (e/f) of a repeating unit (e) derived from olefin to a repeating unit (f) derived from at least one monomer selected from unsaturated carboxylic acids, unsaturated carboxylates, unsaturated carboxylic anhydrides and vinyl acetate is preferably from about 40/60 to 95/5, particularly from about 60/40 to 90/10 by weight.

When the amount of the repeating unit (e) derived from olefin is not more than the above-described range, the melt-adhesion of the second layer to a substrate comprising a polyolefin-based resin is not obtained, and on the other hand, when the amount of the repeating unit (e) is over than the above-described range, melt-adhesion to the first layer is not obtained, therefore, in any case, there is a fear that a uniform laminated article can no be formed.

This resin composition constituting the second layer contains about 25 to 400 parts by weight, preferably about 40 to 250 parts by weight of the olefin-based copolymer obtained by copolymerization of an olefin and at least one monomer selected from unsaturated carboxylic acids, unsaturated carboxylates, unsaturated carboxylic anhydrides and vinyl acetate to 100 parts by weight of the acrylic resin.

When the amount of the olefin-based copolymer is not more than 25 parts by weight, the melt-adhesion of the second layer to a substrate comprising a polyolefin-based resin is not obtained, and on the other hand, when the amount of the olefin-based copolymer is not less than 400 parts by weight, melt-adhesion of the second layer to the first layer is not obtained, therefore, in any case, there is a fear that a uniform laminated article can not be formed.

When the amount of the olefin-based copolymer is not more than 25% by weight, the melt-adhesion of the second layer to a substrate comprising a polyolefin-based resin is not obtained, and on the other hand, when the amount of the olefin-based copolymer is not less than 400% by weight, melt-adhesion of the second layer to the first layer is not obtained, therefore, in any case, there is a fear that a uniform laminated article can not be formed.

When the resin composition constituting the second layer comprises only olefin-based copolymer having a glycidyl group in a side chain, examples of a monomer copolymerized with an olefin also include unsaturated glycidyl ether such as allylglycidyl ether, 2-methylallylglycidyl ether, styrene-p-glycidyl ether, and like in addition to glycidyl acrylate, glycidyl methacrylate, glycidyl esters of itaconic acid.

In the above-described olefin-based copolymer having a glycidyl group in a side chain, the content of a glycidyl group is, not restricted, about 1 to 20% by weight, preferably about 3 to 12% by weight expressed as the content of a monomer having a glycidyl group in a side chain in the olefin-based copolymer.

When the content of a monomer having a glycidyl group in a side chain in the olefin-based copolymer is not more than 1% by weight, the melt-adhesion of the second layer to the first layer is not obtained, and on the other, when the content of a monomer having a glycidyl group in a side chain in the olefin-based copolymer is over than 20% by weight, melt-adhesion of the second layer to a substrate composed of a polyolefin-based resin is not obtained, therefore, in any case, there is a fear that a uniform laminated article can no be formed.

The resin composition constituting the second layer may also contain acrylic polymer particles. The acrylic polymer particle is a particle containing acrylic rubber as a main component and having rubber elasticity. The particle may have a one-layer structure or a multi-layer structure.

As this acrylic polymer particle, the above-described acrylic polymer particle having a multi-layer structure which contains a rubber elastomer layer may be used.

The amount of this acrylic polymer particle used in the second layer is usually about 5 to 50 parts by weight to 100 parts by weight of the above-described resin compound.

Further, the resin composition constituting the second layer may also contains various polyolefin-based resins other than the above-described polyolefin-based copolymer. Examples of preferable polyolefin-based resin include an ethylene-based resin comprising ethylene unit as a main component and a propylene-based resin comprising propylene unit as a main component.

Among them, as the polyethylene-based resin, there are listed, for example, homopolymers of ethylene such as low density polyethylenes obtained by a radical polymerization method, high density polyethylenes obtained by an ion polymerization method, and the like, and additionally, there are listed ethylene-α-olefin copolymers obtained by copolymerizing ethylene with an α-olefin, and the like.

As the α-olefin, one or more of α-olefins having about 3 to 20 carbon atoms such as propylene, buten-1, 4-methyl pentene-1, hexene-1, octene-1, decene-1, octadecene-1 and the like are used.

The content of α-olefin in a copolymer of ethylene and α-olefin is usually from about 5 to 98% by weight.

As the polypropylene-based resin, there are listed copolymers of propylene with an α-olefin, in addition to polypropylene which is a homopolymer of propylene.

As the α-olefin, one or more of those described above can be use, and suitable examples of a copolymer of propylene and α-olefin include a copolymer of propylene and butene-1, a copolymer of propylene, ethylene and butene-1, and the like.

The amount of the polyolefin-based resin is less than about 50 parts by weight to 100 parts by weight of the olefin-based copolymer. When the amount of the polyolefin-based resin is over than about 50 parts by weight, melt-adhesion of the second layer to the first layer is not obtained because the amount of the acrylic resin becomes relatively smaller, therefore, there is a fear that a uniform laminated article can no be formed.

The thickness of the second layer is not particularly restricted, and preferably from about 10 to 300 $\mu$m, and further preferably from about 50 to 200 $\mu$m When the thickness of the second layer is not more than the 10 $\mu$m, there is a tendency that close adhesion with the first layer and a substrate comprising a polyolefin-based resin is not sufficient. On the other and, when the thickness of the layer is not less than 300 $\mu$m, there is a fear that the strength of the laminated article decrease.

This second layer may be colored layer, and for coloring, coloring agents such as, for example, dyes, pigments and the like may advantageously be contained, and dye or pigments are appropriately selected and used depending on the intended color. The content of the coloring agent is usually from about 1 to 20 parts by weight per 100 parts by weight of the total amount of the resin composition constituting the second layer.

Also, a metallic color can be made when a metal powder is contained in coloring. As the metal powder, flat metal powders such as a flat aluminum piece and the like can preferably be used.

Further, a pearl color can also be made by inclusion of mica and the like.

When metal powders, mica and the like are used, the use amount thereof is from about 1 to 10 parts by weight per 100 parts by weight of the total amount of the resin composition constituting the second layer.

Metal powders or mica and the like may be used in combination with the above-described coloring agent or each may be used alone. When a metal powder or mica and the like is used in combination with a coloring agent, an acrylic resin laminated film can be obtained which has a metallic-like or pearl-like appearance and has been colored. When a metal powder is used alone, a metallic color corresponding to the kind of the metal used is obtained. Specifically, a silver metallic color is obtained when an aluminum piece is used alone.

In the acrylic laminated film of the present invention, a white- or black-colored third layer having a thickness from 150 $\mu$m or more comprising of the same resin composition as those described for the second layer, may also be laminated on the second layer side. By lamination of such a third layer, penetration of the color of a polyolefin-based resin molded article through the acrylic resin laminated film can be prevented or saturation of a color becomes excellent.

It is necessary that the third layer is white- or black-colored, and for this, a white pigment such as titanium oxide and the like or a black pigment such as carbon black and the like may advantageously be contained. The content of the pigment is usually from about 0.3 to 5 parts by weight per 100 parts by weight of the resin composition constituting the third layer. When less than about 0.3 parts by weight, the color of a backing, polyolefin-based resin molded article, may sometimes be seen through the third layer.

It is necessary that the thickness of the third layer is about 150 $\mu$m or more. When not more than 150 $\mu$m, a backing, polyolefin-based resin tends be seen through the third layer, therefore, the thickness is preferably about 150 $\mu$m or more. When the thickness is not less than 300 $\mu$m the whole film thickness tends to unnecessarily increase, therefore, the thickness is preferably less than 300 $\mu$m.

Further, weather-resistant agents such as known antioxidants, ultraviolet absorbers, light stabilizers and the like; flame retardants, coloring agents, inorganic fillers and the like may also be added to an acrylic resin and a resin composition constituting the above-described first layer and second layer, respectively.

As the antioxidant, hinderedphenol-based antioxidants, phosphorus-based antioxidants, sulfur-based antioxidants and the like are listed.

As the ultraviolet absorber, benzotriazole-based or benzophenone-based ultraviolet absorbers are generally used alone or in admixture of two or more, and from the standpoints of inhibition of evaporation from the acrylic resin laminated film and prevention of deterioration of the substrate as a ground layer, benzotriazole-based ultraviolet absorbers having high molecular weight are preferable used.

As the specific example of the benzotriazole-based ultraviolet absorber having high molecular weight, there is, for example, 2,2-methylenebis[4-(1,1,3,3-tetramethylbutyl)-6-(2H-benzotriazole-2-yl)phenol], and the addition amount thereof is preferably about 1000 ppm or more.

As the light stabilizer, there are listed, for example, hindered amine-based light stabilizers and the like.

The acrylic resin laminated film of the present invention having the above-described first layer and the second layer together can be produced by various method such as, for example, a so-called co-extrusion T-die molding method in which both resins are extruded in the form of layers and laminated approximately at the same time, a method disclosed in Japanese Patent Application Laid-Open (JP-A) No. 7-314629 in which a resin composition which is a raw material of the second layer is melt-extruded in the form of a layer and laminated onto one surface of the first layer previously formed by a T-die extrusion molding method, and the like, When the productivity of the acrylic resin laminated film and close adhesion between the above-described both first layer and second layer are taken into consideration, there is most preferably adopted a production method of the present invention in which one surface of the first layer previously formed by a T-die extrusion molding method, a calender processing method and the like as described above is treated with corona discharge, then, a resin composition which is a raw material of the second layer is melt-extruded in the form of a layer and laminated onto the treated surface.

The condition of the corona discharge treatment in this production method is not particularly restricted, and the corona discharge density is preferably from about 50 to 200 W·min./m$^2$, further preferably from about 75 to 150 W·min./m$^2$.

When the corona discharge density is not more than the above-described range, there is a fear that the close adhesion between the first layer and the second layer after lamination decreases, and on the other hand, when over the above-described range, there are fears that the treated surface of the first layer deteriorate causing discoloration of the first layer, or the close adhesion between the first layer and the second layer decreases to the contrary.

The condition of the melt-extrusion of the resin composition is also not particularly restricted, and the melting temperature of the resin composition is preferably from about 180 to 340° C., further preferably from about 220 to 320° C.

When the melting temperature of the resin composition not more than the above-described range, there is a fear that the close adhesion between the first layer and the second layer after lamination decreases, and on the other hand, when over the above-described range, there are fears that the treated surface of the first layer deteriorate causing discoloration of the first layer, or the close adhesion between the first layer and the second layer decreases to the contrary.

In the production method of the laminated film, the close adhesion between the first layer and the second layer after lamination can be further improved by oxidation treatment by, for example, blowing ozone at a concentration of 5 to 50 mg/m$^2$ to the surface of the first layer side of the second layer melt-extruded in the form of a layer directly before lamination with the first layer.

The acrylic resin laminated film comprising three layers is obtained by co-extrusion molding method in which three resins or resin compositions constituting three layers are respectively extruded in the form of a layer and laminated approximately at the same time.

Also, in the present invention, it is preferable for decreasing the outer haze of the acrylic resin laminated film after production to mold the acrylic resin laminated film formed by laminating the first layer and the second layer as described above or the first layer before lamination by passing through a plurality of rolls or metal belts.

The laminated article of the present invention can be constructed by laminating and integrating the acrylic resin laminated film of the present invention produced as described above onto the surface of a substrate comprising a polyolefin in-based resin so that the second layer is in contact with the substrate.

As the polyolefin-based resin constituting the substrate, any of various polyolefin-based resins can be used which can be processed by known methods for molding-processing thermoplastic resins such as, for example, extrusion processing, injection molding, blow molding and the like.

As this polyolefin-based resin, there are listed, for example, polyethylene-based resins such as low density polyethylene, high density polyethylene, a copolymer of ethylene and α-olefin and the like exemplified as the polyolefin-based resin, also polypropylene-based resins such as polypropylene, a copolymer of propylene and α-olefin and the like, and in addition, there can also be used polybutene, poly-4-methylpentene-1 and the like.

These polyolefin-based resins by known synthesis methods using, for example, a solid catalyst, a metallocene-based uniform catalyst and the like.

If necessary, additives such as, for example, styrene-based elastomers, inorganic fillers and the like can also be added in suitable amount to the polyolefin-based resin.

As the polyolefin-based resin, a polypropylene-based resin having low molding shrinkage coefficient among the above-described resins is preferably used in view of assured prevention of occurrence of failures such as wrinkle and the like on the acrylic resin laminated film which is the rear surface in producing a laminated film by the above-described integration-pasting-molding method and the like.

Further, it is preferable to use, as the polyolefin-base resin, that having a linear expansion coefficient at 20 to 100° C. of about $1 \times 10^{-4}$ °C.$^{-1}$ or less, in view of assured prevention of such occurrence of wrinkle and the like and improvement of the dimension stability of a laminated article when used in interior and exterior parts of automobiles for example, and for allowing a polyolefin-based resin to have such low expansion coefficient, it is preferable to add an inorganic filler typified by talc in an amount of about 5 to 40% by weight.

As the resin for a substrate suitable for a signboard having a three-dimensional form and a unique form and the like, a block copolymer of propylene and ethylene having excellent punching processability is preferable particularly among the above-described polyolefin-based resins.

As the substrate, there can also be adopted, for example, a foamed article disclosed in JP-A No. 6-212007, or a hollow plate disclosed in JP-A No. 8-25603.

Among them, the former foamed article preferably has a thickness from about 1 to 20 mm, and a density from about 0.03 to 0.7 g/cm$^3$. The foaming magnification of the foamed article is about 1.3-fold to than 30-fold, preferably about 2-fold to 15-fold. The density of the foamed article is represented by a value measured by a substitution-in-water method, and the foaming magnification is calculated as shown below.

Foaming magnification=(Density of polyolefin-based resin before foaming)/(Density of foamed article)

When the density of a foamed article is over the above-described range, there is a fear that the foaming magnification decreases lower than the above-described range and light weight effect specific to a foamed article becomes insufficient, and on the other hand, when the density of a foamed article is not more than the above-described range, there is a fear that the smoothness of the surface of a substrate decreases though the foaming magnification increases.

On the other hand, as the latter hollow plate, those having a thickness from about 0.5 to 50 mm comprising parallel two top plates supported by a plurality of ribs between them are listed.

Examples of the method for producing the above-described laminated article are as follows:

(1) an extrusion lamination method in which a melted and plasticized polyolefin-based resin composition is extrusion-molded into the form of a substrate through a die set at en extruder and at the same time melt-adhered to the second layer of an acrylic resin laminated film, and (2) a so-called integration-pasting-molding method in which an acrylic resin laminated film is set at a position corresponding to the surface portion of a laminated article in a mold for injection molding having a cavity corresponding to the form of the laminated particle, a polyolefin-based resin is heated and poured in melted condition into the cavity using an injection molding machine, cooled solidified before removal from the mold.

For carrying out the latter integration-pasting-molding method, an apparatus having a so-called inmoldable mold, an equipment for feeding an acrylic resin laminated film into the mold, a heater for softening the fed acrylic resin laminated film, and a suction equipment for allowing the softened acrylic resin laminated film to adhere closely along the mold surface corresponding to the surface form of the laminated article of the mold may advantageously be used.

It is also permissible that an acrylic resin laminated film is formed previously into a form corresponding to the surface form of the laminated article by a vacuum molding machine or compressed air molding machine, then, set along the mold surface and injection-molded.

For foaming the substrate, it may be permissible that a foaming agent which foams by excess heating is added into a polyolefin-based resin used in the above-described methods (1) and (2), and the foaming agent is allowed to foam simultaneously with molding.

Thus obtained laminated article of the present invention is preferable that the surface gloss of the surface formed on the first layer of the acrylic resin laminated film covering the surface portion thereof is about 80% or more, particularly about 85% or more in terms of the 60° mirror gloss defined in JIS K7105.

The laminated article of the present invention is required to have not only excellent gloss but also excellent surface hardness, for substituting a painting process, and for example, it is preferable that the pencil hardness according to the pencil scratching test method defined in JIS K5400 is B or more, particularly HB or more.

Further, the laminated article of the present invention is required also to have excellent close adhesion to the first layer, and for example, it is preferable that the number of lattices remaining unpeeled of an acrylic resin laminated film is 80, particularly 90 out of 100 when a cellophane tape is peeled quickly in a film close adhesion test described later.

This laminated article of the present invention has excellent transparency, ornamental property, surface hardness, weather-resistance, oil-resistance and the like which are characteristics of an acrylic resin constituting the most outer surface, and additionally, manifests excellent molding processability, recycling property, punching and bending processability, heat-resistance, cold-resistance and the like which are characteristics of a polyolefin-based resin which is a substrate.

The laminated article of the present invention does not cause problems such as warping deformation, reduction of mechanical abilities, increase in cost and the like described above, since the laminated article uses the acrylic resin laminated film in which the number of layers is reduced as compared with conventional laminated film.

Moreover, since none of an acrylic resin laminated film and a substrate constituting the laminated article include chlorine, there is no need to care influences caused by chlorine and compounds thereof.

Accordingly, the laminated article of the present invention can be suitably used, for example, for interior and exterior parts of automobiles, parts of domestic electric appliances, and the like, and additionally, can be processed by punching and bending, therefore, the laminated article is also suitable for forming a signboard having a three-dimensional form and the like, general merchandises, as well as other articles. Further, when used for a signboard, a merit is also obtained that the life of the signboard is long due to low tendency to crack.

EXAMPLES

The following examples and comparative examples illustrate the present invention below.

The acrylic resin laminated film and the laminated article were subjected to the following tests to evaluate properties thereof.

(1) Thickness of the Film

The thickness of the film was measured by using the stereoscopic microscope manufactured by Anritsu Corp.

(2) 60° Mirror Surface Gloss Test

The 60° mirror surface gloss of the surface of the article was measured according to the measuring method defined in JIS K7105.

(3) Film Close Adhesion Test

Ten cuttings along longitudinal direction and ten cuttings along transversal direction crossing vertically respectively were carved at intervals of 2 mm respectively using a cutter knife on the film laminated surfaces of the laminated articles , to form 100 lattices in total. Then, a cellophane tape [trade name of Nichiban K.K.] having a width of 24 mm was pasted thereon, pressed with fingers then peeled quickly. The number of lattices at which the film was not peeled and remained on the surface of the laminated article was counted, to evaluate the close adhesion of the film. When the number of lattices remaining unpeeld is many, the close adhesion of the film is excellent.

(4) Pencil Scratching Test

The surface hardnesses of the laminated articles were measured according to the pencil scratching test method defined in JIS K5400. Regarding procedure of the measurement, the test was conducted first using a pencil of a hardness of 6B and then the pencil hardness was increased gradually each by one step such as from 5B, 4B. 3 - - -, and the pencil hardness when the surface was first scratched was recorded as the hardness of the surface of the laminated article.

(5) Impact Resistance Test

The impact-resistance of the laminated article was measured by using the high-speed impact testing machine (EHF-U2H-20L: manufactured by SHIMADZU Corporation).

A sample of a laminated article put into a cylindrical hole having a diameter of 2 inches which was arranged in a holder. Then, a dart having a hemisphere tip and a diameter of 0.5 inches struck on the surface of the sample of the laminated film in the holder at a speed of 3 m/sec at 23° C. When the dart shot through the sample, a total energy (kgfmm) absorbed by the sample was measured. Further, a fracture state of a part shot through was observed.

Example 1

Production of Acrylic Resin Laminated Film

Polymethyl methacrylate containing acrylic rubber particles [trade name: OROGLASS DR, manufactured by Sumika Haas Co., Ltd., melt flow rate MFR=1.5 g/10 min.*1] was used as the acrylic resin constituting the first layer.

*1: It was measured according to the method defined in Condition 15 in JIS K7210.

A pellet obtained by melting and kneading 50% by weight of an acrylic resin (a1) and 50% by weight of an ethylene-based copolymer (a2) described below previously using a twin axis extruder of 45 mmφ (set temperature: 250° C.) before pelletizing was used as the resin composition constituting the second layer.

(a1) The same polymethyl methacrylate as used in the acrylic resin constituting the first layer [trade name: OROGLASS DR, manufactured by Sumika Haas Co., Ltd.]

(a2) A copolymer of ethylene and methyl methacrylate [trade name: ACRYFT WH202, manufactured by Sumitomo Chemical Co., Ltd., methyl methacrylate content: 20% by weight, ethylene content: 80% by weight, melt flow rate MFR=3 g/10 min. *2]

*2: It was measured according to the method defined in Condition 4 in JIS K7210 likewise.

Then, the above-described acrylic resin and resin composition were melted at a set temperature of 260° C. using separate single axis extruders respectively, fed to a feed block (set temperature: 260° C.) to be laminated, extruded in the form of a film through a T-die (set temperature: 270° C.), then, molded through a molding roll having three polishing rolls (roll temperature: 60° C.) while being cooled, to produce an acrylic resin laminated film having a 2-layer structure in which the first layer having a thickness of 90 μm and the second layer having a thickness of 10 μm were laminated each other.

Production of Laminated Article

The acrylic resin laminated film produced above was cut into a rectangular piece having a longitudinal size of 150 mm and a transversal size of 200 mm, and fixed using a pressure sensitive adhesive double coated tape to a position corresponding to the surface portion of a laminated article in a cavity corresponding to a laminated article having a longitudinal size of 150 mm, a transversal size of 200 mm and a thickness of 3 mm in a mold for injection molding of center gate type previously installed to an injection molding machine 150D manufactured by FANUC LTD., so that the first layer was in contact with the mold surface (corresponding to the surface of the laminated article).

Under the conditions of a molding temperature of 230° C. and a mold temperature of 50° C., compounded polypropylene [trade mark: "SUMITOMO NORBRENE BYA81E" manufactured by Sumitomo Chemical Co., Ltd., a resin composition obtained by compounding as a modifier 10% by weight of talc into a crystalline propylene-ethylene block copolymer] as the polyolefin-based resin was injection-molded, and a laminated article was produced by the above-described integration-pasting-molding method.

The results of the tests are shown in Table 1.

Example 2

An acrylic resin laminated film having a 2-layer structure in which the first layer having a thickness of 70 μm and the second layer having a thickness of 30 μm were laminated each other was produced in the same manner as in Example 1 except that a pellet obtained by melting and kneading 75% by weight of the above-described acrylic resin (a1) and 25% by weight of the above-described ethylene-based copolymer (a2) previously using a twin axis extruder of 45 mmϕ (set temperature: 250° C.) before pelletizing was used as the resin composition constituting the second layer.

A laminated article having the same size was produced in the same manner as in Example 1 except that this acrylic resin laminated film was used.

The results of the tests are shown in Table 1.

Comparative Example 1

An acrylic resin laminated film having a 2-layer structure in which the first layer having a thickness of 90 μm and the second layer having a thickness of 10 μm were laminated each other was produced in the same manner as in Example 1 except that only the above-described ethylene-based copolymer (a2) was used as the resin composition constituting the second layer.

A laminated article having the same size was produced in the same manner as in Example 1 except that this acrylic resin laminated film was used.

The results of the tests are shown in Table 1.

Comparative Example 2

The same acrylic resin as used in Example 1 was melted at a set temperature of 250° C. using a single axis extruder, extruded in the form of a film through a T-die (set temperature: 270° C.), then, molded through a molding roll having three polishing rolls (roll temperature: 60° C.) while being cooled, to produce an acrylic resin film of a single-layer structure having a thickness of 100 μm.

A laminated article having the same size was produced in the same manner as in Example 1 except that this acrylic resin film of a single layer was used.

The results of the tests are shown in Table 1.

Comparative Example 3

Compounded polypropylene was injection-molded, without setting a film into a cavity of a mold, to produce a single-layer structure.

The results of the tests are shown in Table 1.

TABLE 1

|  | Example 1 | Example 2 | Comparative Example 1 | Comparative Example 2 | Comparative Example 3 |
|---|---|---|---|---|---|
| 60* Mirror surface gloss test | 87% | 87% | 87% | 87% | 26% |
| Film close adhesion | 100 | 83 | 2 | 0 | — |
| Pencil hardness | HB | HB | HB | HB | 6B |

It is confirmed from the table 1 that all of the laminated articles produced in Examples 1 and 2 are excellent in the mirror surface gloss and hardness of the surface as compared with the article in Comparative Example 3 formed from the compounded polypropylene only, and excellent in the close adhesion of the film to the article as compared with the article in Comparative Example 2 in which a single acrylic resin film was laminated and the article in Comparative Example 1 in which only the ethylene-based copolymer was used as the resin composition constituting the second layer.

Example 3

Production of Acrylic Resin Laminated Film

A pellet obtained by melting and kneading 30% by weight of an acrylic resin (p1) and 70% by weight of an acrylic resin (p2) described below previously using a twin axis extruder of 45 mmϕ (set temperature: 250° C.) before pelletizing was used as the acrylic resin constituting the first layer. (p1) The acrylic resin containing a 6-membered ring acid anhydride unit represented by the above-described general formula (i) [trade name: SUMIPEX TR, manufactured by Sumitomo Chemical Co., Ltd., melt flow rate MFR=2 g/10 min. *1](p2) Polymethyl methacrylate containing acrylic rubber particles [trade name: OROGLASS DR, manufactured by Sumika Haas Co., Ltd., melt flow rate MFR=1.5 g/10 min. *1]

*1: It was measured according to the method defined in condition 15 in JIS K7210.

A copolymer of ethylene, vinyl acetate and glycidyl methacrylate [trade name: BONDFAST 2B, manufactured by Sumitomo Chemical Co., Ltd., glycidyl methacrylate content: 12% by weight, vinyl acetate content: 5% by weight, melt flow rate MFR=3 g/10 min. *2 ] was used as the resin composition constituting the second layer.

*2: It was measured according to the method defined in Condition 4 in JIS K7210.

An acrylic resin laminated film having a 2-layer structure in which the first layer having a thickness of 119 μm and the second layer having a thickness of 85 μm were laminated each other was produced in the same manner as in Example 1 except that a pellet obtained by melting and kneading 30% by weight of the above-described acrylic resin (p1) and 70% by weight of the above-described Polymethyl methacrylate (p2) was used as the acrylic resin constituting the first layer and a copolymer of ethylene, vinyl acetate and glycidyl methacrylate was used as the resin compound constituting the second layer.

A laminated article having the same size was produced in the same manner as in Example 1 except that this acrylic resin laminated film was used.

The results of the tests are shown in Table 2.

Example 4

An acrylic resin laminated film having a 2-layer structure in which the first layer having a thickness of 122 μm and the second layer having a thickness of 12 μm were laminated each other was produced in the same manner as in Example 3 except that a thickness of the layers was changed by controlling a condition of a lamination.

A laminated article having the same size was produced in the same manner as in Example 3 except that this acrylic resin laminated film was used.

The results of the tests are shown in Table 2.

Comparative Example 4

An acrylic resin laminated film having a 2-layer structure in which the first layer having a thickness of 125 μm and the second layer having a thickness of 85 μm were laminated each other was produced in the same manner as in Example 3 except that polypropylene having no glycidyl group (melt flow rate MFR=3 g/10 min. *3) was used as the resin composition constituting the second layer.

*3: It was measured according to the method defined in Condition 14 in JIS K7210.

A laminated article having the same size was produced in the same manner as in Example 3 except that this acrylic resin laminated film was used.

The results of the tests are shown in Table 2.

Comparative Example 5

The same acrylic resin as used in Example 3 was melted at a set temperature of 250° C. using a single axis extruder, extruded in the form of a film through a T-die (set temperature: 270° C.), then, molded through a molding roll having three polishing rolls (roll temperature: 60° C.) while being cooled, to produce an acrylic resin film of a single layer having a thickness of 100 μm.

A laminated article having the same size was produced in the same manner as in Example 3 except that this acrylic resin film of a single layer was used.

The results of the tests are shown in Table 2.

Comparative Example 6

Compounded polypropylene was injection-molded, without setting a film into a cavity of a mold, to produce a single-layer structure.

The results of the tests are shown in Table 2.

TABLE 2

|  | Example 3 | Example 4 | Comparative Example 4 | Comparative Example 5 | Comparative Example 6 |
| --- | --- | --- | --- | --- | --- |
| 60* Mirror surface gloss test | 87% | 87% | 87% | 87% | 26% |
| Film close adhesion | 100 | 83 | 0 | 0 | — |
| Pencil hardness | HB | HB | HB | HB | 6B |
| Total absorption energy (kgfmm) | 1481 | 931 | 1250 | 1300 | 1392 |
| Fracture state | ductile | fragile | fragile | fragile | ductile |

It is confirmed from the table 2 that all of the laminated articles produced in Examples 3 and 4 are excellent in the mirror surface gloss and hardness of the surface as compared with the article in Comparative Example 6 formed from the compounded polypropylene only, and excellent in the close adhesion of the film to the article as compared with the article in Comparative Example 5 in which a single acrylic resin film was laminated and the article in Comparative Example 4 in which polypropylene having no glycidyl group was used as the resin composition constituting the second layer.

Example 5

A mixture of 99.5 parts by weight of an acrylic resin [manufactured by Sumitomo Chemical Co., Ltd., "SUMIPEX EX"] and 0.5 parts by weight of an ultraviolet absorber [manufactured by Asahi Denka Kogyo K.K., "LA-31"], was used as the acrylic resin constituting the first layer.

A resin composition having a silver metallic color containing 100 parts by weight of a copolymer of ethylene and methyl methacrylate [trade name: ACRYFT WH202, manufactured by Sumitomo Chemical Co., Ltd.], 100 parts by weight of an acrylic resin containing an acrylic rubber particle [trade name: OROGLASS DR, manufactured by Sumika Haas Co., Ltd.] and 4 parts by weight of a metal powder [manufactured by Tokyo Aluminum K. K., flat aluminum powder, average particle size: 30 μm, average thickness: 5 μm] was used as the resin composition constituting the second layer.

Further, a white resin composition containing 100 parts by weight of a copolymer of ethylene and methyl methacrylate (trade name: ACRYFT WH202, manufactured by Sumitomo Chemical Co., Ltd.], 100 parts by weight of an acrylic resin containing an acrylic rubber particle [trade name: OROGLASS DR, manufactured by Sumika Haas Co., Ltd.] and 5 parts by weight of a pigment [titanium oxide] was used as the resin composition constituting the third layer.

These three kinds of the resins were co-extruded at a molding temperature of 260° to obtain an acrylic resin laminated film [long wound article having a width of 1000 mm] comprising a first layer (transparent) having a thickness of 100 μm, a second layer (silver metallic) having a thickness of 200 μm and a third layer (white) having a thickness of 200 μm.

When this acrylic resin laminated film was observed from the first layer side, the acrylic resin maintained transparent feeling and revealed a deep silver metallic color.

If a polypropylene-based resin is injection-molded and simultaneously pasted onto the third layer side using this acrylic resin laminated film, a polypropylene-based resin molded article can be obtained in which the surface thereof has been ornamented by the acrylic resin laminated film.

Example 6

An acrylic resin laminated film having a 2-layer structure in which the first layer(transparent) having a thickness of 100 μm and the second layer(silver matallic) having a thickness of 200 μm were laminated each other was produced in the same manner as in Example 5 except that the resin composition constituting the third layer was not used.

When this acrylic resin laminated film was observed from the first layer side, the acrylic resin maintained transparent feeling and revealed a deep silver metallic color.

If a polypropylene-based resin is injection-molded and simultaneously pasted onto the second layer side using this acrylic resin laminated film, a polypropylene-based resin molded article can be obtained in which the surface thereof has been ornamented by the acrylic resin film.

The invention being thus described, it will be obvious that the same may be varied in many ways. Such variations are not to be regarded as a departure from the sprit and scope of the invention, and such modifications as would be obvious to one skilled in the art are intended to be included within the scope of the following claims.

What is claimed is:

1. An acrylic resin laminated film comprising
   a first layer comprising an acrylic resin; and
   a second layer comprising a resin composition comprising an acrylic resin and an ethylene-based copolymer obtained by copolymerization of an ethylene and at least one monomer selected from the group consisting of unsaturated carboxylic acids, unsaturated carboxylates, unsaturated carboxylic anhydrides,
      wherein the acrylic resin constituting the first layer contains no acrylic polymer particles having a multilayer structure which contains a rubber elastomer, and the ethylene-based copolymer is about 25 to 250 parts by weight per 100 parts by weight of the acrylic resin in the resin composition constituting the second layer.

2. The acrylic resin laminated film according to claim 1, wherein the ethylene-based copolymer is a copolymer of ethylene and alkyl methacrylate.

3. The acrylic resin laminated film according to claim 1, wherein the resin composition constituting the second layer contains acrylic rubber particles.

4. The acrylic resin laminated film according to claim 1, wherein the acrylic resin consituting the first layer is an acrylic resin containing a 6-membered ring acid anhydride unit represented by the general formula (i) in an amount of 3 to 30% by weight based on the acrylic resin constituting the first layer,

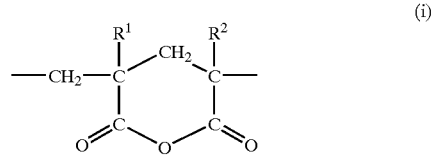

(i)

wherein $R^1$ and $R^2$ are the same or different and represent a hydrogen atom or an alkyl group.

5. The acrylic resin laminated film according to claim 1, wherein the second layer is colored.

6. A laminated article wherein an acrylic resin laminated film according to claim 1 or 5 is laminated and integrated onto the surface of a substrate comprising a polyolefin resin so that the second layer is in contact with the substrate.

7. The acrylic resin laminated film according to claim 1, wherein the acrylic resins in the first and second layer, independently, are at least one polymer selected from the group consisting of
   polymers of alkyl methacrylates;
   copolymers of alkyl methacrylates and alkyl acrylates;
   polymers of alkyl methacrylates which have a 6-membered ring acid anhydride unit represented by formula (i):

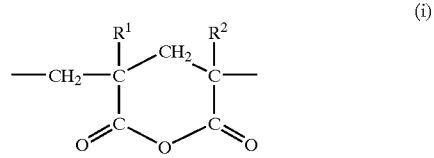

(i)

wherein $R^1$ and $R^2$ are the same or different and represent a hydrogen atom or an alkyl group having 1 to about 5 carbon atoms; and
   copolymers of alkyl methacrylates and alkyl acrylates, said copolymers having a 6-membered ring acid anhydride unit represented by said formula (i).

8. The acrylic resin laminated film according to claim 1, wherein the at least one monomer is selected from the group consisting of unsaturated carboxylic acids and unsaturated anhydrides.

* * * * *